(12) United States Patent
Kuribayashi

(10) Patent No.: US 8,094,353 B2
(45) Date of Patent: Jan. 10, 2012

(54) CYLINDRICAL LENS, OPTICAL BEAM SCANNING APPARATUS USING THE SAME, IMAGE FORMING APPARATUS, AND METHOD OF MANUFACTURING THE LENS

(75) Inventor: Yasushi Kuribayashi, Shizuoka-Ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 307 days.

(21) Appl. No.: 12/267,266

(22) Filed: Nov. 7, 2008

(65) Prior Publication Data
US 2009/0128879 A1    May 21, 2009

Related U.S. Application Data

(60) Provisional application No. 60/988,755, filed on Nov. 16, 2007.

(51) Int. Cl.
*G02B 26/08* (2006.01)

(52) U.S. Cl. .................................... 359/205.1

(58) Field of Classification Search ............. 359/205.1, 359/207.6
See application file for complete search history.

(56) References Cited

U.S. PATENT DOCUMENTS

| 4,213,157 A * | 7/1980 | DeBenedictis et al. .... 359/224.1 |
| 4,719,492 A * | 1/1988 | Hyodo .......................... 355/52 |
| 6,359,674 B1 * | 3/2002 | Horiuchi ...................... 359/254 |

FOREIGN PATENT DOCUMENTS

| JP | 06-160609 | 6/1994 |
| JP | 2001-281512 | 10/2001 |

* cited by examiner

*Primary Examiner* — Euncha Cherry
(74) *Attorney, Agent, or Firm* — Patterson & Sheridan, LLP

(57) ABSTRACT

A cylindrical lens according to the present invention is a cylindrical lens of a bi-concave type in which both of a surface on which light is made incident and a surface from which the light is emitted are formed as concave surfaces, wherein, in at least one of the concave surfaces, both ends of the concave surface projecting to outer sides are formed to coincide with a plane, a normal of the plane being an optical axis of the cylindrical lens.

24 Claims, 6 Drawing Sheets

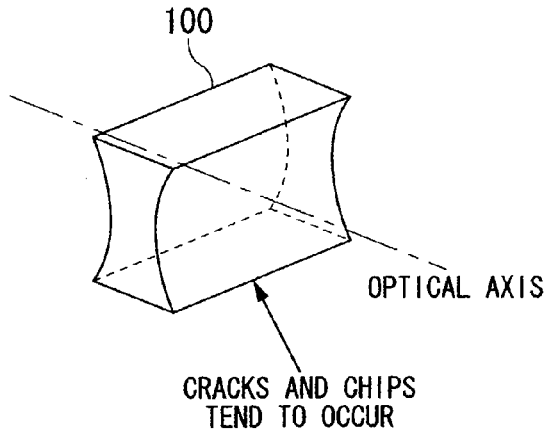
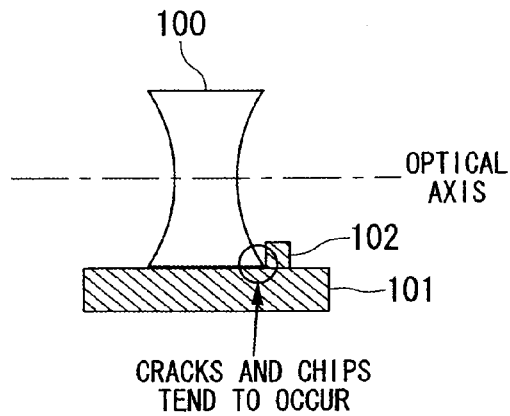
FIG. 4A  FIG. 4B
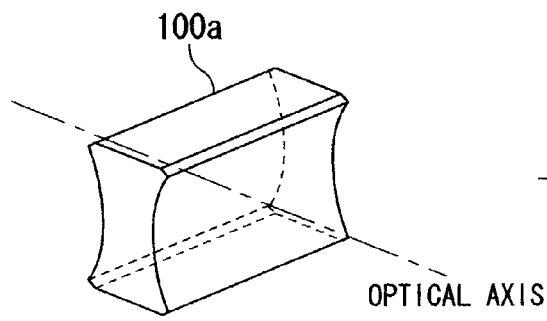
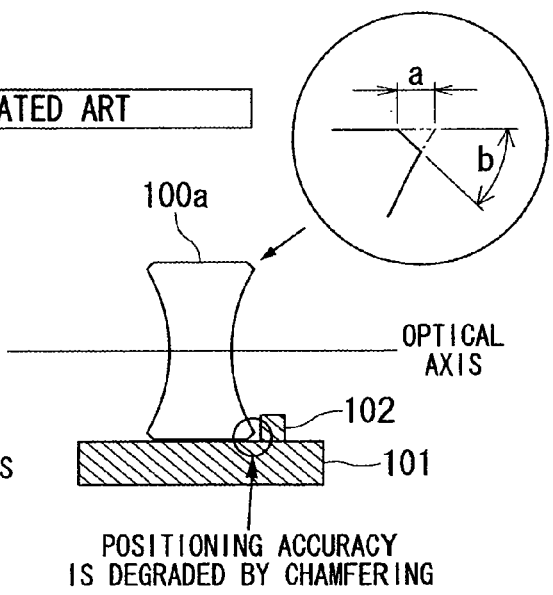
FIG. 5A  FIG. 5B

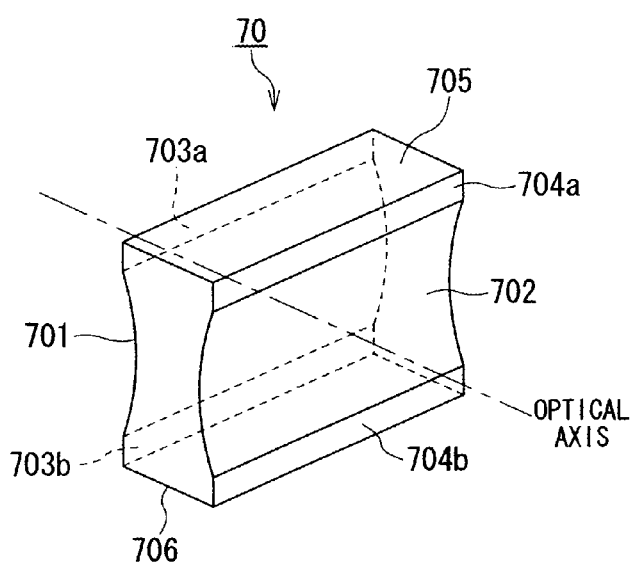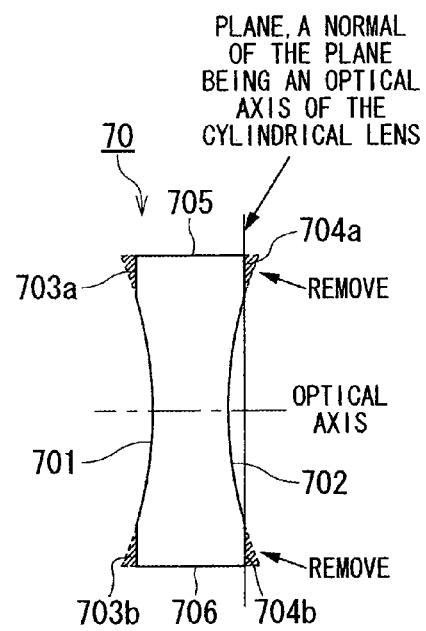# FIG. 6A
FIG. 6B
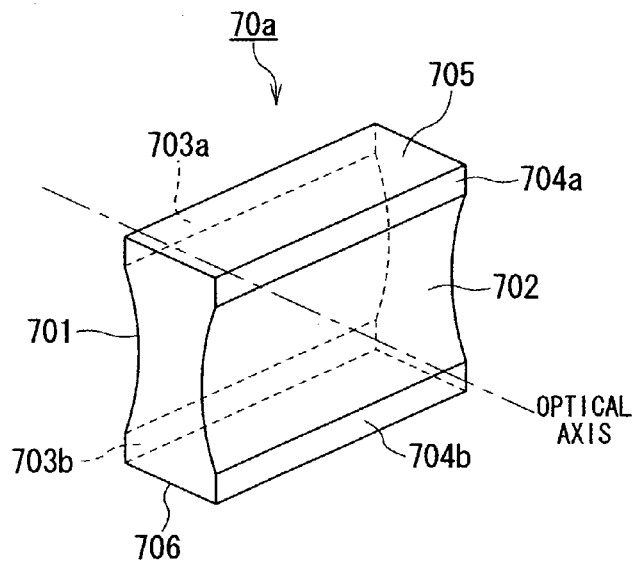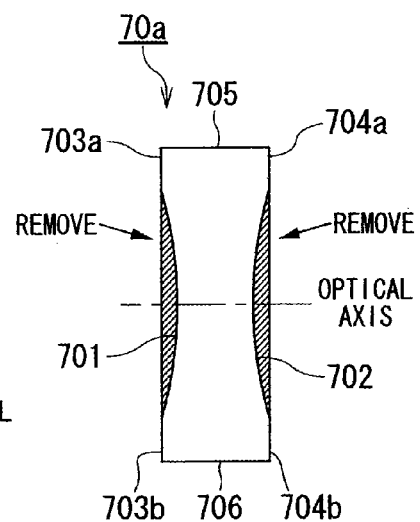
FIG. 7A
FIG. 7B

CYLINDRICAL LENS, OPTICAL BEAM SCANNING APPARATUS USING THE SAME, IMAGE FORMING APPARATUS, AND METHOD OF MANUFACTURING THE LENS

CROSS-REFERENCE TO RELATED APPLICATIONS

This application is based upon and claims the benefit of priority from: U.S. provisional application 60/988,755, filed on Nov. 16, 2007, the entire contents of each of which are incorporated herein by reference.

TECHNICAL FIELD

The present invention relates to a cylindrical lens, an optical scanning apparatus using the same, an image forming apparatus, and a method of manufacturing the lens, and, more particularly to a cylindrical lens used in a scanning optical system, an optical scanning apparatus using the same, an image forming apparatus, and a method of manufacturing the lens.

BACKGROUND

An image forming apparatus employing an electrophotographic process such as a copying machine, a printer, or a multi-function peripheral (MFP) has an optical scanning apparatus for scanning a light beam modulated according to a level of image data in a main scanning direction of a photoconductive drum.

In the optical scanning apparatus, various cylindrical lenses are used in order to form a beam from light output from a light source. The cylindrical lenses include a cylindrical lens of a plano-convex type, one surface of which is a plane and the other surface of which is formed in a convex shape, a cylindrical lens of a plano-concave type, one surface of which is a plane and the other surface of which is formed in a concave shape, a cylindrical lens of a bi-convex type, both surfaces of which are formed in a convex shape, and a cylindrical lens of a bi-concave type, both surfaces of which are formed in a concave shape. The light passes through the surfaces. These cylindrical lenses may be independently used or some of the cylindrical lenses may be used in combination.

When the cylindrical lenses are arranged on an optical path of the scanning optical system, it is necessary to accurately match a direction of the optical path and a direction of an optical axis of the cylindrical lenses. Positioning of the cylindrical lenses (in the following explanation, positioning includes angle adjustment for the cylindrical lenses) is extremely important.

In the cylindrical lenses of the plano-convex type and the plano-concave type, each one of the surfaces is a plane. Therefore, these cylindrical lenses can be relatively easily positioned by providing reference surfaces in bases on which the cylindrical lenses are mounted and matching the planes of the lenses and the reference surfaces of the bases.

In the case of the cylindrical lens of the bi-convex type, if accuracy of a bottom surface thereof is high, it is possible to position the cylindrical lens by pressing a convex surface on one side against a reference plane provided in a base.

In contrast, in the cylindrical lens of the bi-concave type, although a plane serving as a reference can be provided on a bottom surface, a plane serving as a reference is not present in an optical axis direction of the lens. Therefore, conventionally, when the cylindrical lens of the bi-concave type is mounted on a base, a method of performing optical axis alignment by pressing both edges of a concave surface against a reference surface provided perpendicularly to the base is often adopted.

However, in particular, in a cylindrical lens of the bi-concave type formed of a glass material, since a crack and a chip tend to occur at edges of a concave surface, the cylindrical lens cannot be held with sufficiently strong force. When a crack or a chip occurs at the edges, the cylindrical lens may not be able to be positioned at a right angle.

In order to prevent a crack and a chip of the edges, a method of chamfering the edges is often adopted. However, in a chamfering method in the past, even after chamfering is performed, an edge portion projecting in an optical axis direction of the cylindrical lens remains. Therefore, highly accurate positioning cannot be expected.

SUMMARY

The present invention has been devised in view of the circumstances and it is an object of the present invention to provide a cylindrical lens of a bi-concave type that can be easily and highly accurately positioned when mounted on a base and can be prevented from being cracked and chipped, an optical scanning apparatus using the same, an image forming apparatus, and a method of manufacturing the lens.

In order to attain the object, a cylindrical lens according to an aspect of the present invention is a cylindrical lens of a bi-concave type in which both of a surface on which light is made incident and a surface from which the light is emitted are formed as concave surfaces, wherein, in at least one of the concave surfaces, both ends of the concave surface projecting to outer sides are formed to coincide with a plane, a normal of the plane being an optical axis of the cylindrical lens.

An optical scanning apparatus according to another aspect of the present invention includes a light source; a pre-deflection optical system that applies predetermined properties to a optical beam emitted from the light source; an optical deflecting device that reflects and deflects the optical beam, to which the predetermined properties are applied by the pre-deflection optical system, to scan along an object to be scanned in a main scanning direction; and one or more cylindrical lenses which are disposed between the light source and the optical deflecting device, and are parts of the pre-deflection optical system, wherein, the cylindrical lens is a cylindrical lens of a bi-concave type in which both of a surface on which light is made incident and a surface from which the light is emitted are formed as concave surfaces, and in at least one of the concave surfaces, both ends of the concave surface projecting to outer sides are formed to coincide with a plane, a normal of the plane being an optical axis of the cylindrical lens.

An image forming apparatus according to another aspect of the present invention includes an optical scanning apparatus. The optical scanning apparatus includes a light source; a pre-deflection optical system that applies predetermined properties to a optical beam emitted from the light source; an optical deflecting device that reflects and deflects the optical beam, to which the predetermined properties are applied by the pre-deflection optical system, to scan along an object to be scanned in a main scanning direction; and one or more cylindrical lenses which are disposed between the light source and the optical deflecting device, and are parts of the pre-deflection optical system, wherein, the cylindrical lens is a cylindrical lens of a bi-concave type in which both of a surface on which light is made incident and a surface from which the light is emitted are formed as concave surfaces, and in at least one of the concave surfaces, both ends of the concave surface projecting to outer sides are formed to coincide with a plane, a normal of the plane being an optical axis of the cylindrical lens.

A method of manufacturing a cylindrical lens according to still another aspect of the present invention is a method of manufacturing a cylindrical lens of a bi-concave type in which both of a surface on which light is made incident and a surface from which the light is emitted are formed as concave surfaces, the method comprising machining at least one of the concave surfaces such that both ends of the concave surface projecting to outer sides are formed to coincide with a plane, a normal of the plane being an optical axis of the cylindrical lens.

DESCRIPTION OF THE DRAWINGS

In the accompanying drawings:

FIGS. 4A and 4B are first diagrams showing a conventional shape of a cylindrical lens of a bi-concave type in the past;

FIGS. 5A and 5B are second diagrams showing a conventional shape of a cylindrical lens of the bi-concave type;

FIGS. 6A and 6B are diagrams showing an example of a shape of a cylindrical lens (a first example) of the bi-concave type according to the embodiment;

FIGS. 7A and 7B are diagrams showing an example of a shape of a cylindrical lens (a second example) of the bi-concave type according to the embodiment.

DETAILED DESCRIPTION

Figure 1:
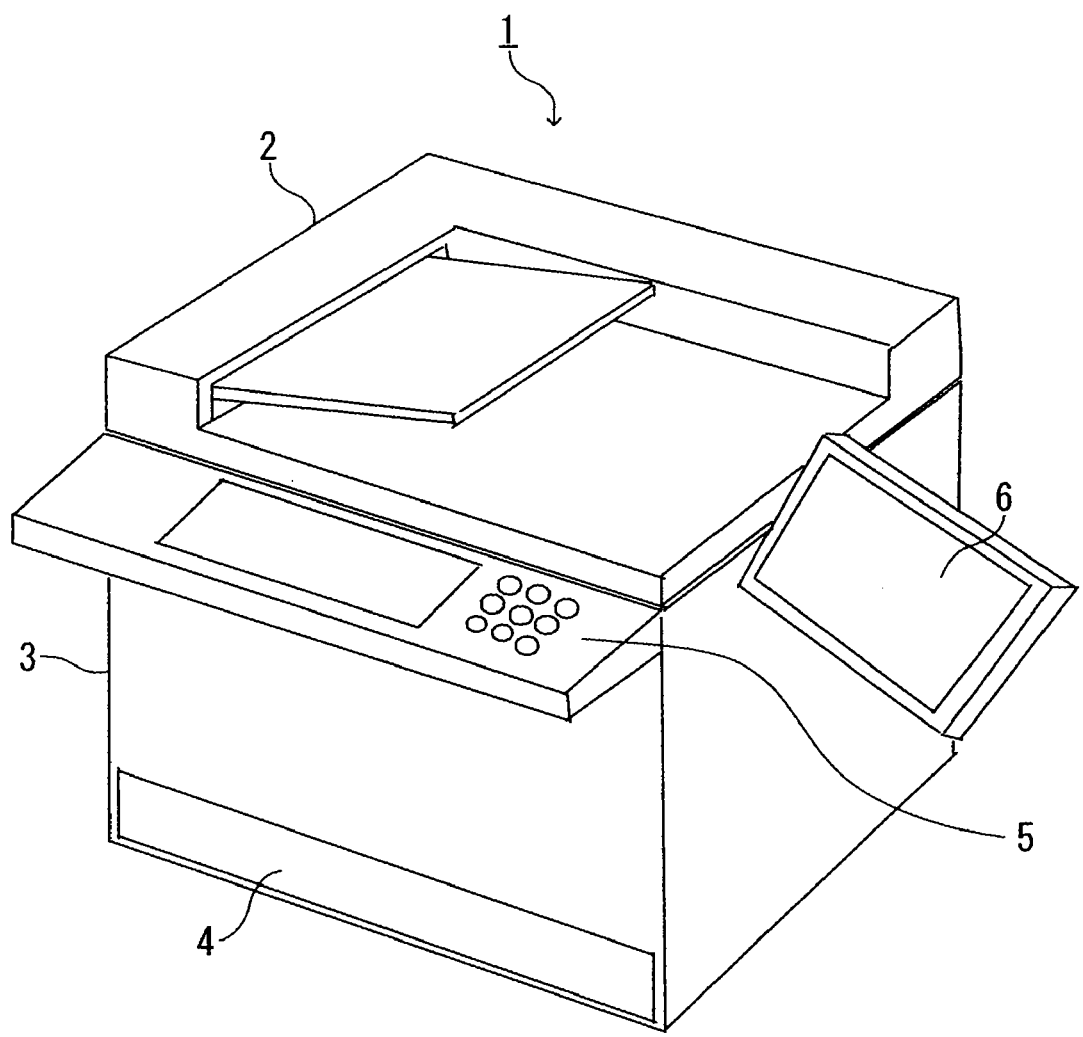
FIG. 1 is a perspective view showing an example of an external appearance of an image forming apparatus according to an embodiment of the present invention.

An embodiment of the present invention is explained below with reference to the accompanying drawings.
(1) Image forming apparatus FIG. 1 is a diagram showing an example of an external appearance of a copying machine (or an MFP) as a typical example of an image forming apparatus 1 according to this embodiment.

The image forming apparatus 1 includes a scanning unit 2, an image forming unit 3, and a paper feeding unit 4.

The scanning unit 2 optically scans an original placed on an original stand or an original inputted to an ADF (Auto Document Feeder) and generates image data.

The image forming unit 3 prints the image data on a sheet fed from the paper feeding unit 4 using an electrophotographic process. A control panel 5 with which a user performs various kinds of operation and a display panel 6 for displaying various kinds of information are provided in the image forming unit 3.

Figure 2:
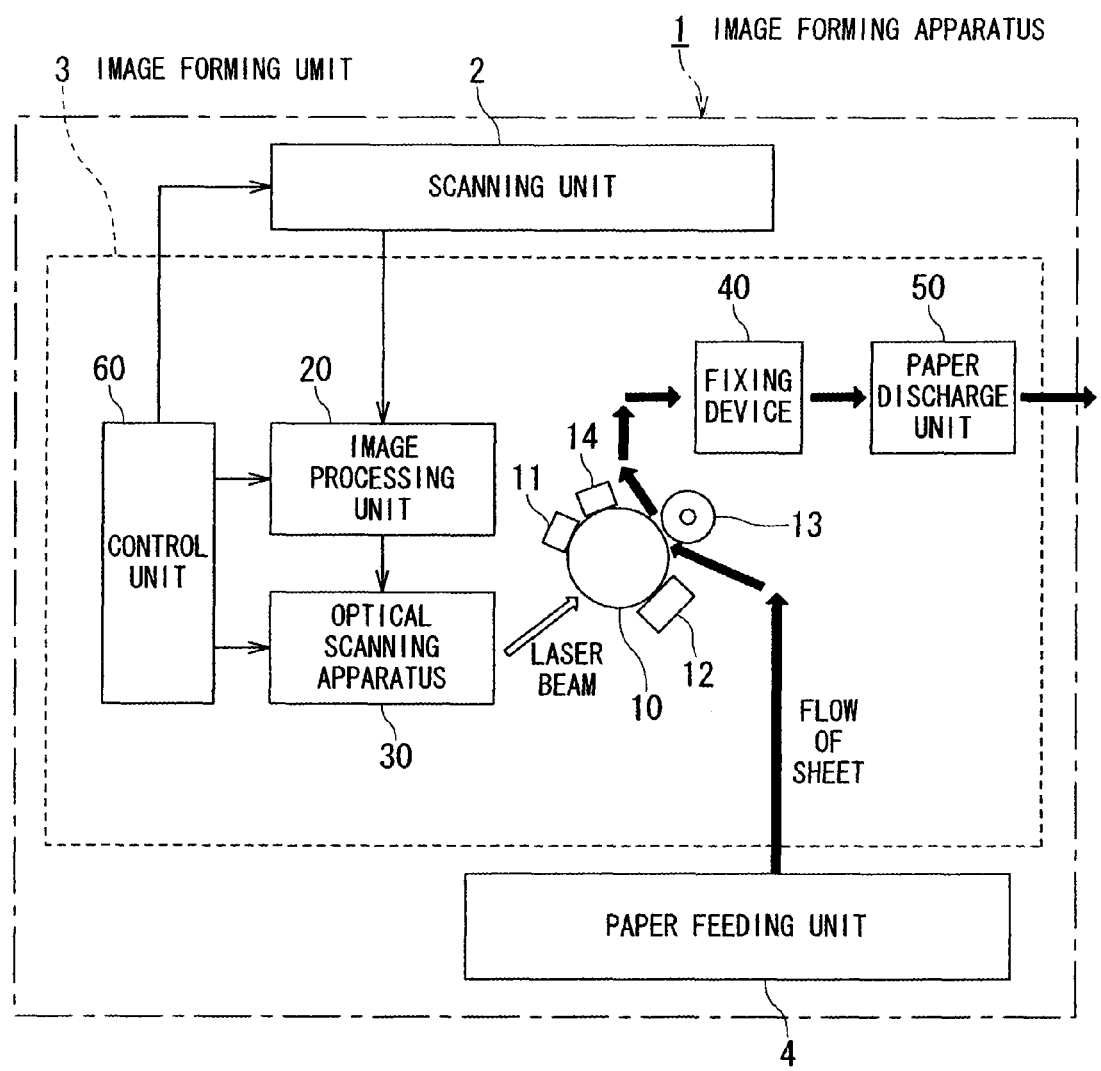
FIG. 2 is a sectional view showing a configuration example of an image forming apparatus according to the embodiment.

FIG. 2 is a schematic sectional view mainly showing an example of an internal configuration of the image forming unit 3. The image forming unit 3 includes a photoconductive drum 10. A charging device 11, a developing device 12, a transfer roller 13, a cleaner 14, and the like are disposed around the photoconductive drum 10 in order from an upstream side to a downstream side of the rotation of the photoconductive drum 10.

The surface of the photoconductive drum 10 is uniformly charged to predetermined potential by the charging device 11. Thereafter, a laser beam pulse-width-modulated according to a level of the image data is irradiated on the surface of the photoconductive drum 10.

The image data scanned from the original by the scanning unit 2 is subjected to predetermined image processing by an image processing unit 20 and, then, inputted to an optical scanning apparatus 30. The optical scanning apparatus 30 generates the laser beam pulse-width-modulated according to the level of the image data as described above and scans the generated laser beam in a rotation axis direction of the photoconductive drum 10, i.e., a main scanning direction.

When the laser beam is irradiated on the surface of the photoconductive drum 10, the potential in an irradiated portion of the surface falls. An electrostatic latent image is formed on the surface of the photoconductive drum 10.

The developing device 12 develops the electrostatic latent image on the photoconductive drum 10 with a toner. A toner image is formed on the surface of the photoconductive drum 10 by this development.

Meanwhile, a sheet is picked up from the paper feeding unit 4 and conveyed to a position where the photoconductive drum 10 and the transfer roller 13 are opposed to each other (a transfer position). The toner image on the photoconductive drum 10 is transferred onto the sheet conveyed to the transfer position. The toner image transferred on the sheet is heated and pressed to be fixed on the sheet by a fixing device 40. Thereafter, the sheet is discharged to the outside of the image forming apparatus 1 by a paper discharge unit 50.

In the photoconductive drum 10 from which the transfer of the toner image onto the sheet is finished, the toner remaining on the surface is removed by the cleaner 14. The photoconductive drum 10 is prepared for printing of the next sheet. It is possible to perform continuous printing by repeating the processing described above.

A control unit 60 performs individual control for respective components such as the scanning unit 2, the image processing unit 20, and the optical scanning apparatus 30 and overall control for the image forming apparatus 1.

Figure 3:
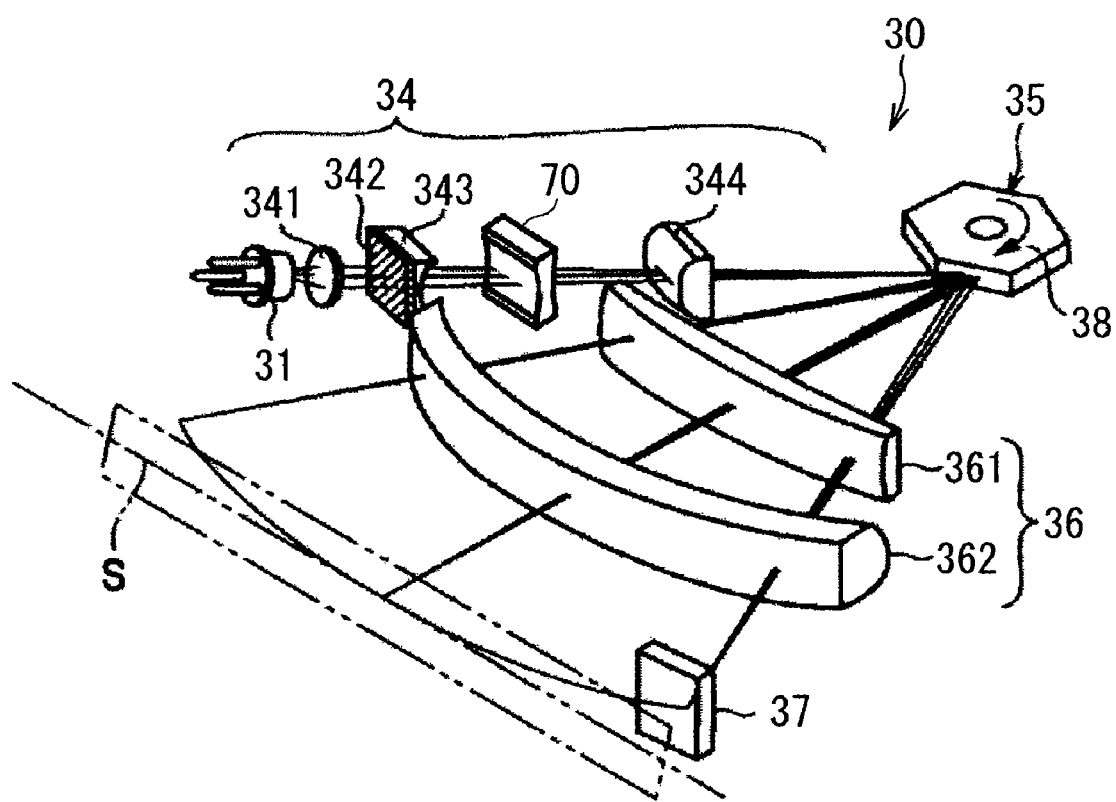
FIG. 3 is a diagram showing a configuration example of an optical scanning apparatus the image forming apparatus.

FIG. 3 is a diagram showing a configuration example of the optical scanning apparatus 30. The optical scanning apparatus 30 includes a light source 31 that outputs a laser beam, a pre-deflection optical system 34, an optical deflecting device 35, and a post-deflection optical system 36.

The pre-deflection optical system 34 includes a collimate lens 341 that changes the laser beam outputted from the light source 31 to parallel light, an aperture 342 that gives a predetermined beam sectional shape, a cylindrical lens 343 of a plano-concave type that gives focusing properties in a sub-scanning direction, a cylindrical lens 70 of a bi-concave type, and a cylindrical lens 344 of a plano-convex type.

The optical deflecting device 35, a typical example of which is a polygon mirror, has plural reflection surfaces. The optical deflecting device is rotated in a direction of an arrow 38 shown in the figure by a motor (not shown) at predetermined rotating speed to thereby scan the laser beam in the main scanning direction.

The post-deflection optical system 36 includes focusing lenses (fθ lenses, etc.) 361 and 362 for focusing the laser beam deflected by the optical deflecting device on a surface S of the photoconductive drum 10 linearly and with an equal beam diameter.

Besides, a beam detector 37 is arranged on an upstream side in the main scanning direction. The optical scanning apparatus 30 obtains a horizontal synchronizing signal from the beam detector 37.

(2) Cylindrical Lens

As described above, the cylindrical lens 343 of the plano-concave type, the cylindrical lens 70 of the bi-concave type, the cylindrical lens 344 of the plano-convex type, and the like are disposed in the optical scanning apparatus 30 of the image forming apparatus 1. Among the cylindrical lenses, the cylindrical lens 70 of the bi-concave type according to this embodiment is explained below.

First, problems of conventional cylindrical lenses 100 and 100a of the bi-concave type are schematically explained with reference to FIGS. 4A and 4B and FIGS. 5A and 5B.

As shown in FIG. 4A, the conventional cylindrical lens 100 of the bi-concave type has edge portions of an acute shape at both ends of a concave surface in the center. In particular, the cylindrical lens 100 formed of a glass material is inconvenient in handling because cracks and chips tend to occur at the edge portions.

When the cylindrical lens 100 is mounted, as shown in FIG. 4B, a bottom surface of the cylindrical lens 100 is placed on a base 101 and the edge portion on a lower side of the cylindrical lens 100 is pressed against a reference plate 102 for optical axis alignment to position the cylindrical lens 100.

However, since the edge portion is formed in the acute shape and cracks and chips tend to occur in the edge portion, the edge portion cannot be held with sufficiently strong force and highly accurate positioning is difficult. When a crack or a chip actually occurs in the edge portion, correct positioning cannot be performed.

In this way, in the conventional cylindrical lens 100 of the bi-concave type, since the acute angle becomes more acute from the center to the edge portions, cracks and chips extremely easily occur in the edge portions.

In order to suppress the occurrence of cracks and chips, as shown in FIG. 5A, there is also the cylindrical lens 100a, edge portions of which are chamfered. The handling of the cylindrical lens 100a itself becomes easier by the chamfering.

However, the conventional chamfering is performed for the purpose of preventing the occurrence of cracks and chips. As shown in an encircled area shown in FIG. 5B, in general, the chamfering is performed by specifying, for example, length (a) from the tip of the edge and a chamfering angle (b°). The chamfering angle is, for example, about 45°. Therefore, portions projecting in an optical axis direction remain in the edge portions of the chamfered cylindrical lens 100a. High dimensional accuracy in the projecting portions after the chamfering cannot be obtained. Therefore, as shown in FIG. 5B, when the edge portion after the chamfering is pressed against the reference plate 102 to position the cylindrical lens 100a, high positioning accuracy cannot be obtained.

FIGS. 6A and 6B are diagrams showing a shape of the cylindrical lens 70 (a first example) according to this embodiment (FIG. 6A) and a method of machining the cylindrical lens 70 (FIG. 6B).

In the cylindrical lens 70, a first concave surface 701 on which light is made incident (or from which the light is emitted) and a second concave surface 702 opposed to the first concave surface are formed in an optical axis direction of the cylindrical lens 70. The cylindrical lens 70 has a top surface 705 and a bottom surface 706.

A first upper plane 703a is formed between the first concave surface 701 and the top surface 705. A first lower plane 703b is formed between the first concave surface 701 and the bottom surface 706.

Similarly, a second upper plane 704a is formed between the second concave surface 702 and the top surface 705. A second lower plane 704b is formed between the second concave surface 702 and the bottom surface 706.

As shown in FIG. 6B, the second upper plane 704a and the second lower plane 704b are formed to coincide with a plane, a normal of the plane being an optical axis of the cylindrical lens 70.

Similarly, the first upper plane 703a and the first lower plane 703b are formed to coincide with a plane, a normal of the plane being an optical axis of the cylindrical lens 70.

In the first and second concave surfaces 701 and 702 of the cylindrical lens 70 (the first example), both upper and lower ends projecting to the outer sides are removed to form the planes, and each normal of the planes is the optical axis of the cylindrical lens 70.

In the shape of the cylindrical lens 70 according to this embodiment, since the edges of the acute shape of the conventional cylindrical lens 100 are not present, cracks and chips in the edges do not occur and handling of the cylindrical lens 70 becomes easier.

In addition, the planes (703a and 703b or 704a and 704b) at both the ends are planes each normal of which is the optical axis of the cylindrical lens 70 having the optical axis of the cylindrical lens 70 as a normal. Therefore, when the cylindrical lens 70 is pressed against the reference plate 102 shown in FIG. 4B and FIG. 5B and positioned, or when the cylindrical lens 70 is pressed against positioning members 806a and 807b (see FIGS. 8A and 8B) of a lens mount 80 described later and positioned, positioning can be performed at high accuracy.

As a method of manufacturing the cylindrical lens 70 (the first example), for example, first, entire both surfaces of a plate glass member is ground into a concave shape to form the cylindrical lens 100 of the bi-concave type having the shape in the past shown in FIGS. 4A and 4B. Subsequently, edge portions of an acute shape of the cylindrical lens 100 are removed in a direction orthogonal to an optical axis of the cylindrical lens 100 by treatment such as grinding. With such a method, it is possible to form planes each normal of which is the optical axis of the cylindrical lens 70 at both ends of the concave surface 701 (or 702).

FIGS. 7A and 7B are diagrams showing a shape of a cylindrical lens 70a (a second example) (FIG. 7A) and a method of machining the cylindrical lens 70a (FIG. 7B).

The shape of the cylindrical lens 70a (the second example) shown in FIG. 7A is the same as the shape of the cylindrical lens 70 (the first example). However, as shown in FIG. 7B, the method of machining the cylindrical lens 70a is different from the method of machining the cylindrical lens 70 (the first example).

In the cylindrical lens 70a of the second example, the vicinities of the centers of both surfaces of a parallel plate glass are formed into concave cylindrical shapes (concave surfaces 701 and 702). In this case, planes of the parallel plate glass are left at both ends of the formed concave surfaces 701 and 702. The left planes form planes (703a and 703b or 704a and 704b) each normal of which is an optical axis of the cylindrical lens 70a.

For the formation of the concave cylindrical shapes (the concave surfaces 701 and 702), conventional techniques such as grinding can be used.

In the cylindrical lens 70a of the second example, the planes at both the ends of the concave surfaces are exactly the planes of the parallel plate glass. In the cylindrical lens 70 of the first example, machining for forming the concave surfaces and machining for forming the planes at both the ends are necessary. However, in the cylindrical lens 70a of the second example, the concave surfaces only have to be machined.

Therefore, it is possible to further reduce a positional error between a cylindrical R shape and the planes compared with the first example.

(3) Lens Mount

Figure 8A:
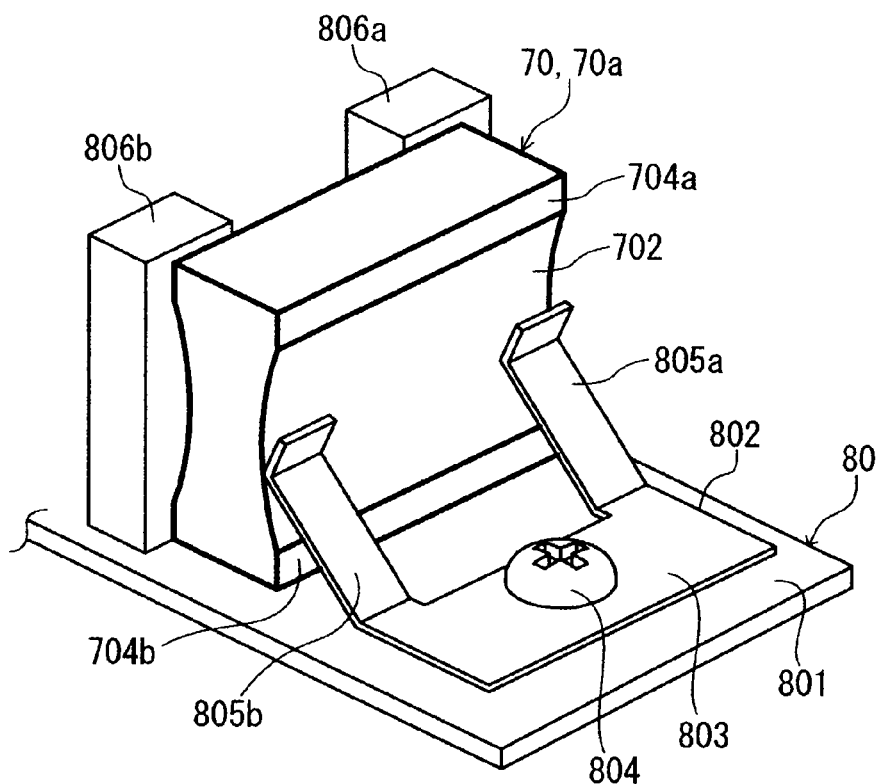
FIGS. 8A and 8B are diagrams showing a configuration example of a cylindrical lens of the bi-concave type according to the embodiment and a lens mount for mounting the cylindrical lens.
Figure 8B:
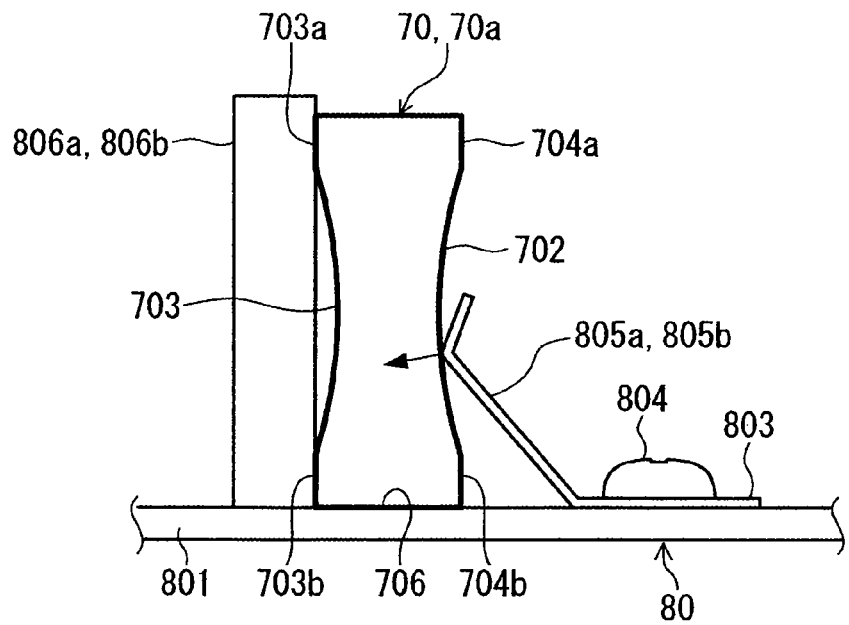

FIGS. 8A and 8B are diagrams showing a configuration example of the cylindrical lens 70 mounted on the lens mount 80 and the lens mount 80.

The lens mount 80 includes a base 801, positioning members 806a and 806b, and a leaf spring 802.

The base 801 is a member that supports the bottom surface 706 of the cylindrical lens 70. The positioning members 806a and 806b are members that extend from the base 801 in a direction orthogonal to the optical axis (an upward direction perpendicular to the base 801), come into contact with the planes 703a and 703b at both the ends of one concave surface 703 of the cylindrical lens 70, and support and position the cylindrical lens 70 in the optical axis direction. A space necessary for allowing light to pass is secured between the two positioning members 806a and 806b.

One end of the leaf spring 802 is formed as a flat attaching section 803. The attaching section 803 is fixed to the base 801 by a screw 804. The other end of the leaf spring 802 forms two leaf spring main bodies 805a and 805b that extend from the attaching section 803 and distal ends of which are formed substantially in an L shape.

The leaf spring main bodies 805a and 805b are in contact with the concave surface 702 of the cylindrical lens 70 in a bent portion of the L shape. The cylindrical lens 70 is pressed in a direction toward the positioning members 806a and 806b with the urging force of the leaf spring main bodies 805a and 805b.

The leaf spring main bodies 805a and 805b can more stably apply the urging force to the cylindrical lens 70 by pressing the concave surface 702 in a lower half area on the base 801 side of the concave surface 702.

Further, as indicated by an arrow in FIG. 8B, a direction in which the urging force is applied is set in a direction orthogonal to a tangential line of the concave surface 702 in a position where the leaf spring main bodies 805a and 805b and the concave surface 702 are in contact with each other. This makes it possible to apply the urging force of the leaf spring main bodies 805a and 805b most efficiently and in a stable state without a slip and the like.

The distal ends of the leaf spring main bodies 805a and 805b are formed in an L shape opened to an upper side. Therefore, in mounting the cylindrical lens 70, it is possible to easily mount the cylindrical lens 70 (with one touch of a finger) by pushing the cylindrical lens 70 in between the leaf spring main bodies 805a and 805b and the positioning members 806a and 806b from above the lens mount 80. As a result, it is possible to perform work for attaching the cylindrical lens 70 to lens mount 80 in an extremely short time. Similarly, work for removing the cylindrical lens 70 is easy.

It is possible to perform the positioning of the cylindrical lens 70 in a short time and at high accuracy by bringing the planes, each normal of the planes being the optical axis of the cylindrical lens 70, formed at both the ends of the cylindrical lens 70 into press-contact with the positioning members 806a and 806b of the lens mount 80.

As it is seen from FIGS. 8A and 8B, the planes at both the ends of the cylindrical lens 70 do no always have to be provided on both the surfaces of the lens and may be provided only on a surface that is brought into press-contact with the positioning members 806a and 806b.

As explained above, with the cylindrical lens 70 (70a) of the bi-concave type, an optical canning apparatus 30 using the same, an image forming apparatus 1, and a method of manufacturing the lens 70 (70a), according to the embodiment, it is possible to easily and highly accurately perform positioning in mounting the cylindrical lens 70 (70a) on the base. Further, it is possible to prevent cracks and chips from occurring.

The present invention is not limited to the embodiment per se. At an implementation stage, it is possible to modify and embody the elements without departing from the spirit of the present invention. It is possible to form various embodiments of the invention by appropriately combining plural elements disclosed in the embodiment. For example, several elements may be deleted from all the elements described in the embodiment. Further, elements described in different embodiments may be appropriately combined.

What is claimed is:

1. A cylindrical lens comprising:
   a concave surface part which has a concave surface on which light is made incident and a concave surface from which the light is emitted; and
   a plane part which has a plane at both projecting ends of at least one of the concave surfaces, a normal of the plane being parallel to an optical axis of the cylindrical lens, a total length of the plane part at said both projecting ends being shorter than a length of the concave surface part in a direction perpendicular to both the optical axis and a cylindrical axis of the cylindrical lens.

2. The cylindrical lens according to claim 1, wherein the plane is provided on each of the concave surfaces.

3. The cylindrical lens according to claim 1, wherein the concave surfaces are formed such that vicinities of centers of both surfaces of a parallel plate member are formed in concave cylindrical shapes, and the plane is obtained by leaving the outer sides of parallel plate member.

4. The cylindrical lens according to claim 3, wherein the concave cylindrical shapes are formed by grinding the vicinities of the centers of both the surfaces of the parallel plate member.

5. The cylindrical lens according to claim 1, wherein the cylindrical lens is formed of a glass member.

6. The cylindrical lens according to claim 3, wherein the parallel plate member is a parallel plate glass.

7. An optical scanning apparatus comprising:
   a light source;
   a pre-deflection optical system that applies predetermined properties to a optical beam emitted from the light source;
   an optical deflecting device that reflects and deflects the optical beam, to which the predetermined properties are applied by the pre-deflection optical system, to scan along an object to be scanned in a main scanning direction; and
   one or more cylindrical lenses which are disposed between the light source and the optical deflecting device, and are parts of the pre-deflection optical system, at least one of the cylindrical lenses comprising:
   a concave surface part which has a concave surface on which light is made incident and a concave surface from which the light is emitted, and
   a plane part which has a plane at both projecting ends of at least one of the concave surfaces, a normal of the plane being parallel to an optical axis of the cylindrical lens, a total length of the plane part at said both projecting ends being shorter than a length of the concave surface part in a direction perpendicular to both the optical axis and a cylindrical axis of the cylindrical lens.

8. The apparatus according to claim 7, wherein the plane is provided on each of the concave surfaces.

9. The apparatus according to claim 7, wherein
the concave surfaces are formed such that vicinities of centers of both surfaces of a parallel plate member are formed in concave cylindrical shapes, and
the plane is a plane obtained by leaving the outer sides of parallel plate member.

10. The apparatus according to claim 9, wherein the concave cylindrical shapes are formed by grinding the vicinities of the centers of both the surfaces of the parallel plate member.

11. The apparatus according to claim 7, wherein the cylindrical lens is formed of a glass member.

12. The apparatus according to claim 9, wherein the parallel plate member is a parallel plate glass.

13. The apparatus according to claim 7, further comprising a lens mount for mounting the cylindrical lens, wherein
the lens mount includes:
a base that supports a bottom surface of the cylindrical lens;
a positioning member that extends from the base member in a direction orthogonal to the optical axis and comes into contact with the plane at both the ends of one concave surface of the cylindrical lens; and
a leaf spring that presses the other concave surface of the cylindrical lens in a direction toward the positioning member with urging force.

14. The apparatus according to claim 13, wherein the leaf spring is fixed to the base at one end and is formed substantially in an L shape at the other end and presses the concave surface in a position bent in the L shape.

15. The apparatus according to claim 13, wherein the leaf spring presses the other concave surface of the cylindrical lens in a half area on the base side of the concave surface.

16. The apparatus according to claim 15, wherein the leaf spring applies the urging force in a direction orthogonal to a tangential line of the concave surface in a position where the leaf spring and the concave surface are in contact with each other.

17. A method of manufacturing a cylindrical lens of a bi-concave type in which both of a surface on which light is made incident and a surface from which the light is emitted are formed as concave surfaces, the method comprising machining at least one of the concave surfaces such that both ends of the concave surface projecting to outer sides are formed to coincide with a plane, a normal of the plane being parallel to an optical axis of the cylindrical lens, a total length of a plane part at both projecting ends of the concave surface being shorter than a length of a concave surface part in a direction perpendicular to both the optical axis and a cylindrical axis of the cylindrical lens.

18. The method according to claim 17, further comprising:
forming the concave surfaces such that entire both surfaces of a parallel plate member are formed in concave cylindrical shapes, and
forming the plane by removing both the ends of the respective concave cylindrical shapes.

19. The method according to claim 17, further comprising:
forming the concave surfaces such that vicinities of centers of both surfaces of a parallel plate member are formed in concave cylindrical shapes, and
obtaining the plane by leaving the outer sides of the parallel plate member.

20. The method according to claim 19, further comprising forming the concave cylindrical shapes by grinding the vicinities of the centers of both the surfaces of the parallel plate member.

21. An image forming apparatus comprising an optical scanning apparatus, wherein the optical scanning apparatus comprises:
a light source;
a pre-deflection optical system that applies predetermined properties to a optical beam emitted from the light source;
an optical deflecting device that reflects and deflects the optical beam, to which the predetermined properties are applied by the pre-deflection optical system, to scan along an object to be scanned in a main scanning direction; and
one or more cylindrical lenses which are disposed between the light source and the optical deflecting device, and are parts of the pre-deflection optical system, at least one of the cylindrical lenses comprising:
a concave surface part which has a concave surface on which light is made incident and a concave surface from which the light is emitted, and
a plane part which has a plane at both projecting ends of at least one of the concave surfaces, a normal of the plane being parallel to an optical axis of the cylindrical lens, a total length of the plane part at said both projecting ends being shorter than a length of the concave surface part in a direction perpendicular to both the optical axis and a cylindrical axis of the cylindrical lens.

22. The apparatus according to claim 21, wherein the plane is provided on each of the concave surfaces.

23. The cylindrical lens according to claim 1, wherein
the concave surfaces are formed such that entire both surfaces of a parallel plate member are formed in concave cylindrical shapes, and
the plane is formed by removing both the ends of the respective concave cylindrical shapes.

24. The apparatus according to claim 7, wherein
the concave surfaces are formed such that entire both surfaces of a parallel plate member are formed in concave cylindrical shapes, and
the plane is formed by removing both the ends of the respective concave cylindrical shapes.

* * * * *